(12) United States Patent
Pan et al.

(10) Patent No.: US 12,494,538 B2
(45) Date of Patent: Dec. 9, 2025

(54) STACKING POWER SUPPLY CABINET

(71) Applicant: SUNGROW POWER SUPPLY CO., LTD., Anhui (CN)

(72) Inventors: Feng Pan, Anhui (CN); Shengli Yu, Anhui (CN); Puyun Dong, Anhui (CN); Juntao Zhi, Anhui (CN); Feng Qin, Anhui (CN); Xiaoxun Li, Anhui (CN); Shangfang Dai, Anhui (CN); Yongqiang Yang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 1142 days.

(21) Appl. No.: 17/386,518

(22) Filed: Jul. 27, 2021

(65) Prior Publication Data

US 2022/0059896 A1    Feb. 24, 2022

(30) Foreign Application Priority Data

Aug. 21, 2020  (CN) .......................... 202010849205.2

(51) Int. Cl.
*H01M 50/209* (2021.01)
*H01M 10/42* (2006.01)
(Continued)

(52) U.S. Cl.
CPC ..... *H01M 50/209* (2021.01); *H01M 10/4207* (2013.01); *H01M 10/4257* (2013.01);
(Continued)

(58) Field of Classification Search
CPC ............ H01M 50/209; H01M 50/258; H01M 50/298; H01M 50/271; H01M 10/4207;
(Continued)

(56) References Cited

U.S. PATENT DOCUMENTS

2013/0011719 A1  1/2013 Yasui et al.
2014/0017528 A1* 1/2014 Uehara ............... H01M 10/482
                                                          429/61
(Continued)

FOREIGN PATENT DOCUMENTS

CN    104538569 A    4/2015
CN    205960068 U    2/2017
(Continued)

OTHER PUBLICATIONS

Second Office Action mailed Sep. 26, 2022, in corresponding Chinese Application No. CN202010849205.2 (including English translation).

(Continued)

*Primary Examiner* — Christopher P Domone
(74) *Attorney, Agent, or Firm* — Harness, Dickey & Pierce, P.L.C.

(57) ABSTRACT

A stacking power supply cabinet is provided. The stacking power supply cabinet includes a top assembly and at least one battery module. In a case that the number of the battery module is more than one and the multiple battery modules are stacked sequentially from top to bottom, an electric connection path for power supply and/or storage is established among the stacked multiple battery modules, and the electric connection path is conducted via a power transmission line in the top assembly, and then the battery modules are charged. Thus, in the installation process of the power supply cabinet, the electric connection path for the power supply and/or storage among the multiple stacked battery modules is uncharged before the top assembly is installed, thereby reducing the risk of electric shock to the human body and improving the safety during the installation process of the stacking power supply cabinet.

18 Claims, 10 Drawing Sheets

(51) Int. Cl.
　　*H01M 50/258* (2021.01)
　　*H01M 50/271* (2021.01)
　　*H01M 50/298* (2021.01)
(52) U.S. Cl.
　　CPC ....... *H01M 50/258* (2021.01); *H01M 50/271* (2021.01); *H01M 50/298* (2021.01); *H01M 2010/4271* (2013.01); *H01M 2010/4278* (2013.01)
(58) Field of Classification Search
　　CPC ......... H01M 10/4257; H01M 10/4271; H01M 10/4278
　　See application file for complete search history.

(56) References Cited

U.S. PATENT DOCUMENTS

| 2018/0342892 | A1  | 11/2018 | Zhou et al. | |
|---|---|---|---|---|
| 2019/0237722 | A1* | 8/2019 | Gao | H01M 50/251 |
| 2020/0006821 | A1  | 1/2020 | Oono et al. | |
| 2020/0251700 | A1  | 8/2020 | Toya et al. | |

FOREIGN PATENT DOCUMENTS

| CN | 206099077 U | 4/2017 |
|---|---|---|
| CN | 206790435 U | 12/2017 |
| CN | 206797307 U | 12/2017 |
| CN | 209447901 U | 9/2019 |
| CN | 210429903 U | 4/2020 |
| CN | 210806350 U | 6/2020 |
| EP | 3522313 A1 | 8/2019 |
| JP | 2018206557 A | 12/2018 |
| JP | 2019046550 A | 3/2019 |
| JP | 2019537819 A | 12/2019 |
| WO | 2018032408 A1 | 2/2018 |
| WO | WO-2020102909 A1 | 5/2020 |

OTHER PUBLICATIONS

First Chinese Office Action regarding Application No. 202010849205.2 dated Feb. 28, 2022. English translation provided by Unitalen Attorneys at Law.

Japanese Office Action regarding Application No. 2021-005101 dated Jan. 18, 2022. English translation provided by Unitalen Attorneys at Law.

First Australian Office Action regarding Application No. 2021200028 dated Sep. 2, 2021.

Extended European Search Report regarding Application No. 21151037.5 dated Jul. 1, 2021.

* cited by examiner

STACKING POWER SUPPLY CABINET

The present disclosure claims the priority to Chinese Patent Application No. 202010849205.2, titled "STACKING POWER SUPPLY CABINET", filed on Aug. 21, 2020, with the China National Intellectual Property Administration, the content of which is incorporated herein by reference.

FIELD

The present disclosure relates to the technology field of power electronics, and particularly, to a stacking power supply cabinet.

BACKGROUND

With the rapid development of photovoltaic distributed energy system, a lithium battery, as an import part of a photovoltaic energy storage battery, is widely used in both daily life and industrial production. The voltage of one lithium battery is low, which cannot meet the requirements of an external device. In order to meet the requirements, multiple lithium batteries are usually connected in series to form a power supply cabinet with a voltage of several hundred volts, and each lithium battery in the power supply cabinet is served as a battery module.

In practice, a specific structure of the power supply cabinet is shown in FIG. 1, and an internal circuit thereof is shown in FIG. 2. Referring to FIGS. 1 and 2, the power supply cabinet is usually installed in a particular sequence: firstly a base assembly 03 is installed at the bottom, then battery modules 02 are stacked layer by layer from bottom to top, and finally a power management module 01 is installed at the top. In this installation sequence, there is a voltage between two poles of a connector port on an upper surface of each battery module 02, and the voltage will increase by one step every time one more battery module 02 is stacked. Furthermore, the risk of electric shock to the human body is high during the installation process since the distance between the two poles of the connector port on the upper surface of the battery module 02 is small.

SUMMARY

In view of the above, a stacking power supply cabinet is provided according to embodiments of the present disclosure, so as to reduce the risk of electric shock to the human body during an installation process of a power supply cabinet.

To realize the aforementioned object, following technical solutions are provided according to the embodiments of the present disclosure.

A stacking power supply cabinet is provided, including a top assembly and at least one battery module;
  in a case that a number of the battery modules is more than one, the multiple battery modules are sequentially stacked from top to bottom; and
  an electric connection path for power supply and/or storage is established among the multiple battery modules, and the electric connection path is conducted by the top assembly.
Optionally, the top assembly is a top cover;
  wherein the stacking power supply cabinet further includes a base assembly and a battery management module;
  the top cover, the base assembly, the battery management module and the multiple battery modules are respectively provided with a power transmission line and a signal transmission line inside;
  the power transmission line in the top cover is configured to achieve a short-circuit connection function of the power transmission line and configured to connect to an uppermost battery module;
  the power transmission line in the base assembly is configured to connect to the battery management module and a bottommost battery module; and
  the power transmission line in the battery management module is configured to connect to the base assembly and an external device.
Optionally, the battery management module is arranged on a side of the stacking power supply cabinet.
Optionally, the battery management module further includes: a breaker, a first terminal of a quick pluggable terminal, a positive connector of an energy storage device, and a negative connector of the energy storage device;
  where two power transmission lines from a first end of the breaker pass through the first terminal of the quick pluggable terminal, and are connected to the base assembly; and
  another two power transmission lines from a second end of the breaker are connected to an inner terminal of the positive connector of the energy storage device and an inner terminal of the negative connector of the energy storage device respectively.
Optionally, the number of the power transmission lines are three inside each of the multiple battery modules, that is, a first power transmission line, a second power transmission line and a third power transmission line, wherein:
  the first power transmission line is connected to a positive electrode of the battery module where the first power transmission line is located, and is led out from a first port of a second terminal of a quick pluggable terminal on an upper surface of the battery module;
  the second power transmission line is connected to a negative electrode of the battery module where the second power transmission line is located, and is led out from a first port of a first terminal of a quick pluggable terminal on a lower surface of the battery module; and
  the third power transmission line is connected between a second port of the second terminal of the quick pluggable terminal and a second port of the first terminal of the quick pluggable terminal.
Optionally, the top cover further includes: a DC/DC module, a positive connector of a charging device and a negative connector of the charging device; wherein:
  additional two power transmission lines from the first end of the breaker inside the battery management module are connected to the base assembly, and then connected to a fourth power transmission line and a fifth transmission line passing through each of the multiple battery modules sequentially from bottom to up, and then connected to one side of the DC/DC module;
  another side of the DC/DC module is connected to an inner terminal of the positive connector of the charging device and an inner terminal of the negative connector of the charging device respectively.
Optionally, the number of the power transmission lines is five inside each of the multiple battery modules, that is, a first power transmission line, a second power transmission line, a third power transmission line, a fourth power transmission line and a fifth power transmission line; wherein:

the first power transmission line is connected to a positive electrode of the battery module where the first power transmission line is located, and is led out from a first port of a second terminal of a quick pluggable terminal on an upper surface of the battery module;

the second power transmission line is connected to a negative electrode of the battery module where the second power transmission line is located, and is led out from a first port of a first terminal of a quick pluggable terminal on a lower surface of the battery module;

the third power transmission line is connected between a second port of the second terminal of the quick pluggable terminal and a second port of the first terminal of the quick pluggable terminal;

the fourth power transmission line is connected between a third port of the second terminal of the quick pluggable terminal and a third port of the first terminal of the quick pluggable terminal; and the fifth power transmission line is connected between a fourth port of the second terminal of the quick pluggable terminal and a fourth port of the first terminal of the quick pluggable terminal.

Optionally, one side of the battery module is concave, to embed the battery management module.

Optionally, the stacking power supply cabinet further includes a side cover configured to cover other parts on the side of the battery module.

Optionally, the top assembly is a battery management module; wherein:

the stacking power supply cabinet further includes a base assembly;

the base assembly, the battery management module and each of the multiple battery modules are respectively provided with a corresponding power transmission line and a corresponding signal transmission line inside;

the power transmission line in the battery management module is configured to achieve a short-circuit connection function of the power transmission line and a connection function with an external device, and configured to connect to an uppermost battery module; and the power transmission line in the base assembly is configured to connect to a bottommost battery module.

Optionally, the battery management module further includes: a breaker, a first terminal of a first quick pluggable terminal, a first terminal of a second quick pluggable terminal, a positive connector of an energy storage device, and a negative connector of the energy storage device;

wherein two power transmission lines from a first end of the breaker pass through the first terminal of the first quick pluggable terminal and all the battery modules, and are connected to a second terminal of the first quick pluggable terminal of the base assembly;

another two power transmission lines from a second end of the breaker are connected to an inner terminal of the positive connector of the energy storage device and an inner terminal of the negative connector of the energy storage device respectively;

another power transmission line inside the battery management module is arranged in the first terminal of the second quick pluggable terminal, two terminals of the power transmission line are led out from a first port of the first terminal of the second quick pluggable terminal and a second port of the first terminal of the second quick pluggable terminal respectively, pass through all the battery modules, and are connected to a second terminal of the second quick pluggable terminal of the base assembly; and two power transmission lines from the second terminal of the first quick pluggable terminal are connected to the second terminal of the second quick pluggable terminal inside the base assembly through.

Optionally, the battery management module further includes: a DC/DC module, a positive connector of a charging device, and a negative connector of the charging device;

where two power transmission lines from the first end of the breaker are connected to a side of the DC/DC module; and another side of the DC/DC module is connected to an inner terminal of the positive connector of the charging device and an inner terminal of the negative connector of the charging device respectively.

Optionally, the number of the power transmission lines is five inside each of the multiple battery modules, that is, a first power transmission line, a second power transmission line, a third power transmission line, a fourth power transmission line and a fifth power transmission line; wherein:

the first power transmission line is connected to a positive electrode of the battery module where the first power transmission line is located, and is led out from a first port of a second terminal of a first quick pluggable terminal on an upper surface of the battery module;

the second power transmission line is connected to a negative electrode of the battery module where the second power transmission line is located, and is led out from a first port of a first terminal of a first quick pluggable terminal on a lower surface of the battery module;

the third power transmission line is connected between a second port of the second terminal of the first quick pluggable terminal and a second port of the first terminal of the first quick pluggable terminal;

the fourth power transmission line is connected between a first port of the second terminal of a second quick pluggable terminal on the upper surface of the battery module and a first port of the first terminal of a second quick pluggable terminal on the lower surface of the battery module; and the fifth power transmission line is connected between a second port of the second terminal of the second quick pluggable terminal and a second port of the first terminal of the second quick pluggable terminal.

Optionally, each of the multiple battery modules includes: a battery management system (BMS), a quick pluggable terminal and at least one battery cell; wherein:

positive electrodes of all the battery cells in the battery module are connected in series to form a positive electrode of the battery module, and negative electrodes of all the battery cells in the battery module are connected in series to form a negative electrode of the battery module;

the BMS is connected to all battery cells in the battery module, and is connected to a signal transmission line inside the battery module where the BMS is located; and the quick pluggable terminal includes at least one pair of quick pluggable terminals, and each of the at least one pair of quick pluggable terminals includes a second terminal arranged on an upper surface of the battery module and a first terminal arranged on a lower surface of the battery module.

According to the aforementioned technical solutions, in the stacking power supply cabinet provided by the present disclosure, in a case that a number of the battery modules is more than one and multiple battery modules are stacked sequentially from top to bottom, an electric connection path for power supply and/or storage is established among the multiple stacked battery modules, and the electric connection path is conducted via a power transmission line in a top assembly, and then the battery modules are charged. Thus, in the installation process of the power supply cabinet, the electric connection path for the power supply and/or storage among the multiple stacked battery modules is uncharged before the top assembly is installed, thereby reducing the risk of electric shock to the human body and improving the safety during the installation process of the stacking power supply cabinet.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

FIG. 5 is a schematic structural diagram of a stacking power supply cabinet as shown in FIG. 3a;

DETAILED DESCRIPTION

The technical solutions in the embodiments of the present disclosure will be described clearly and completely hereinafter in conjunction with the drawings in the embodiments of the present disclosure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

In the present disclosure, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

Figure 1:
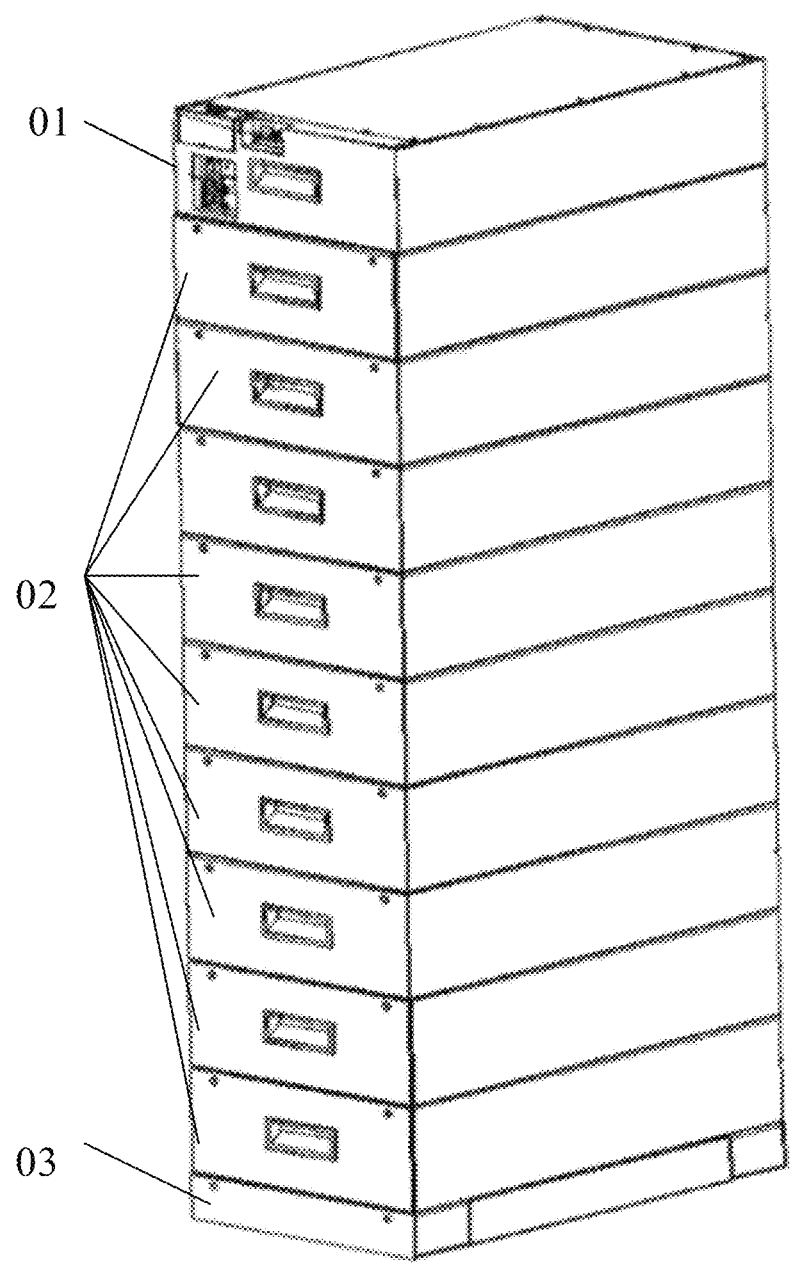
FIG. 1 is a schematic structural diagram of a power supply cabinet in prior art.
Figure 2:
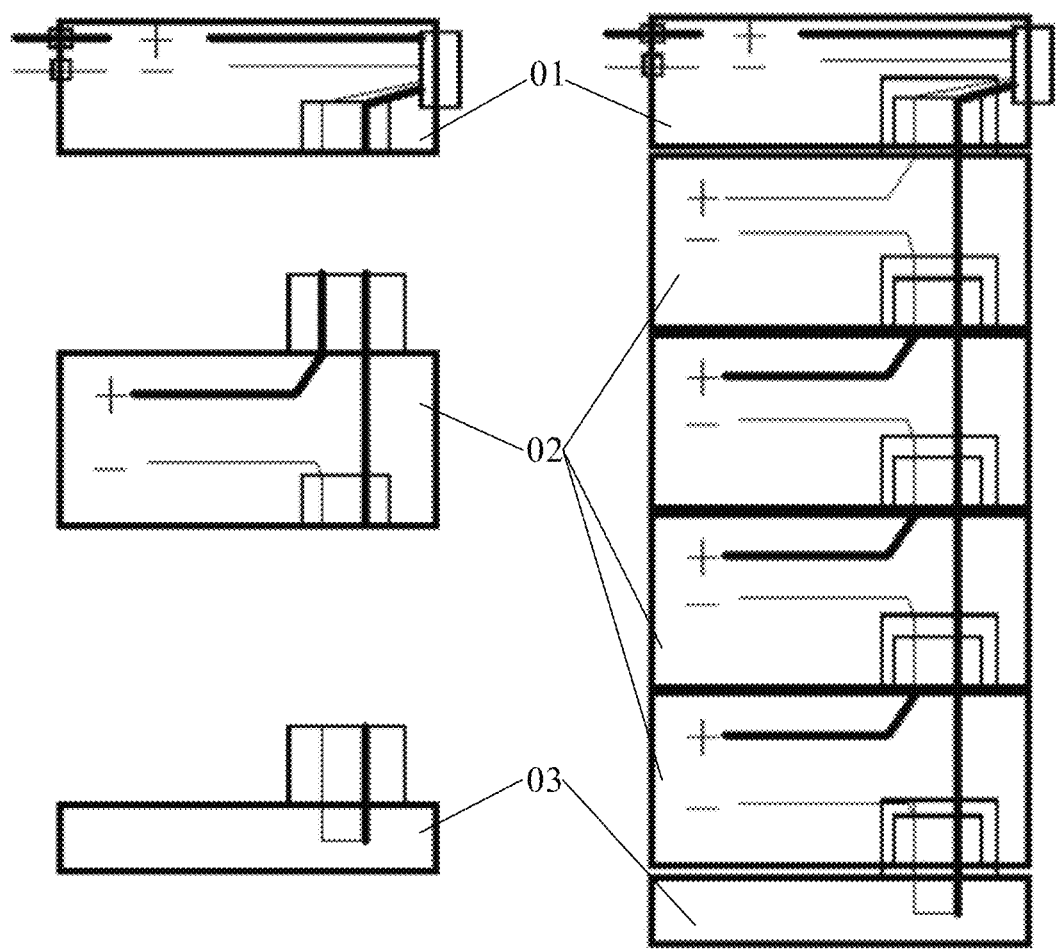
FIG. 2 is a schematic diagram of an internal circuit of a power supply cabinet in prior art.

Reference is made to FIG. 1, which is a power supply cabinet in prior art. The power supply cabinet includes: a power management module 01, battery modules 02 and a base assembly 03. The base assembly 03 is at the bottom, the battery modules 02 are sequentially stacked on the base assembly 03, and the power management module 01 is installed on an uppermost battery module 02. FIG. 2 illustrates an internal circuit of the power supply cabinet. The base assembly 03 has a function of short-circuit connection. The electric connection among the battery modules 02 is conducted before the power management module 01 is installed, that is, an electric path between ports of a plug connector on an upper surface of the uppermost battery module 02 and batteries in all battery modules 02 is formed. Thus, two poles of the ports of the plug connector on the upper surface of the uppermost battery module 02 are always charged. Furthermore, the more the battery modules 02 are stacked, the greater the voltage between the two poles of the ports of the plug connector on the upper surface of the uppermost battery module 02 is, therefore resulting in a high risk of electric shock to human body.

Figure 3A:
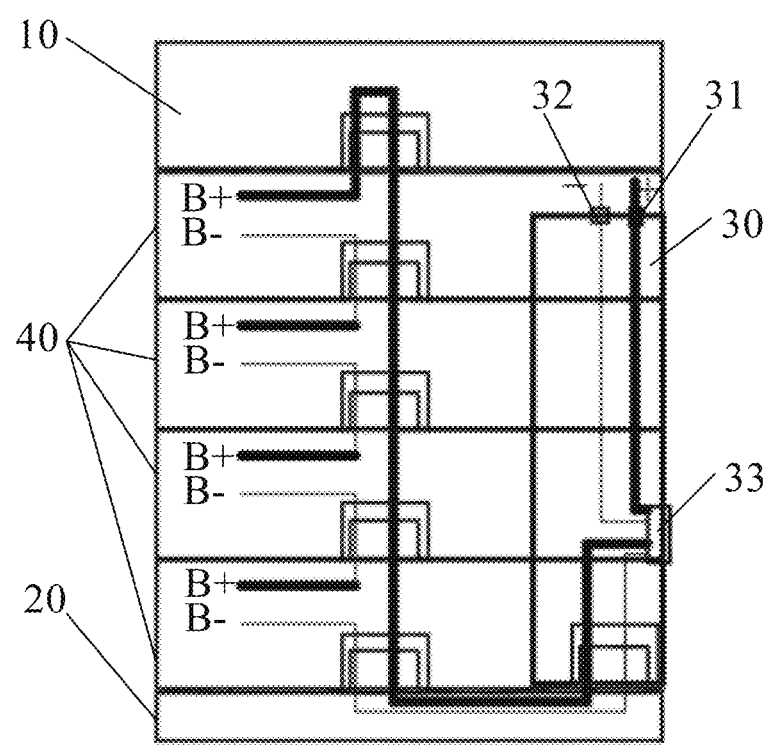
FIG. 3a is a schematic diagram of an internal circuit of a stacking power supply cabinet according to an embodiment of the present disclosure.
Figure 4A:
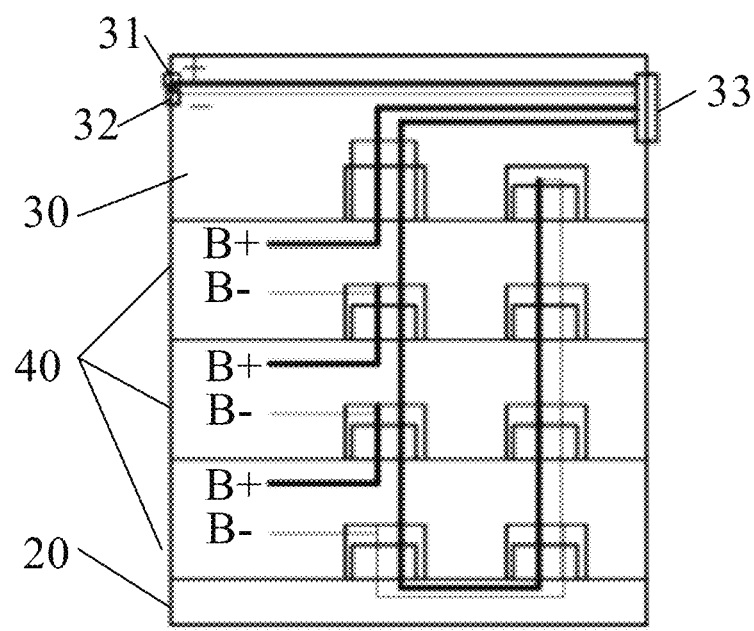
FIG. 4a is a schematic diagram of an internal circuit of a stacking power supply cabinet according to an embodiment of the present disclosure.

A stacking power supply cabinet is provided according to an embodiment of the present disclosure, to solve the problem of high risk of electric shock to human body during the installation process of a power supply cabinet. The stacking power supply cabinet includes a top assembly and at least one battery module 04. Reference is made to FIGS. 3a and 4a, which illustrate a specific connection method of the stacking power supply cabinet.

The number of the battery module 04 may be selected according to specific conditions, which is not limited herein.

In a case that the number of the battery module 04 in the stacking power supply cabinet is more than one, multiple battery modules 04 are stacked from top to bottom in sequence. This kind of top-to-bottom stacking way allows flexible configuration of battery capacity, and additional wiring scheme or an external cabinet are not required, thereby resulting in convenient and easy installation of the power supply cabinet.

Figure 3B:
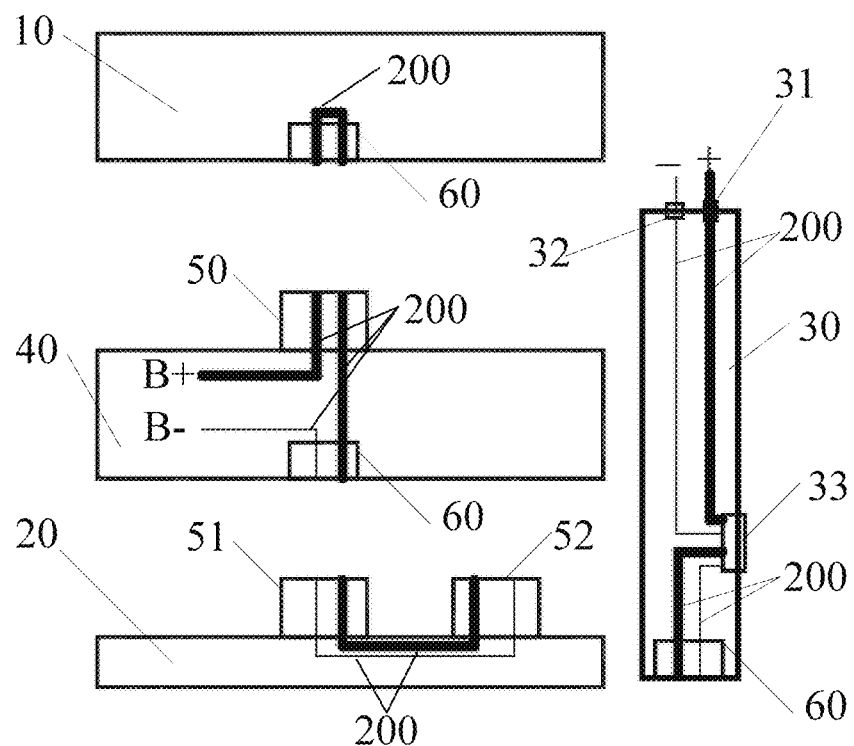
FIG. 3b is a schematic diagram of internal circuits of a top cover, a battery module, a base assembly and a battery management module in a stacking power supply cabinet according to an embodiment of the present disclosure.
Figure 4B:
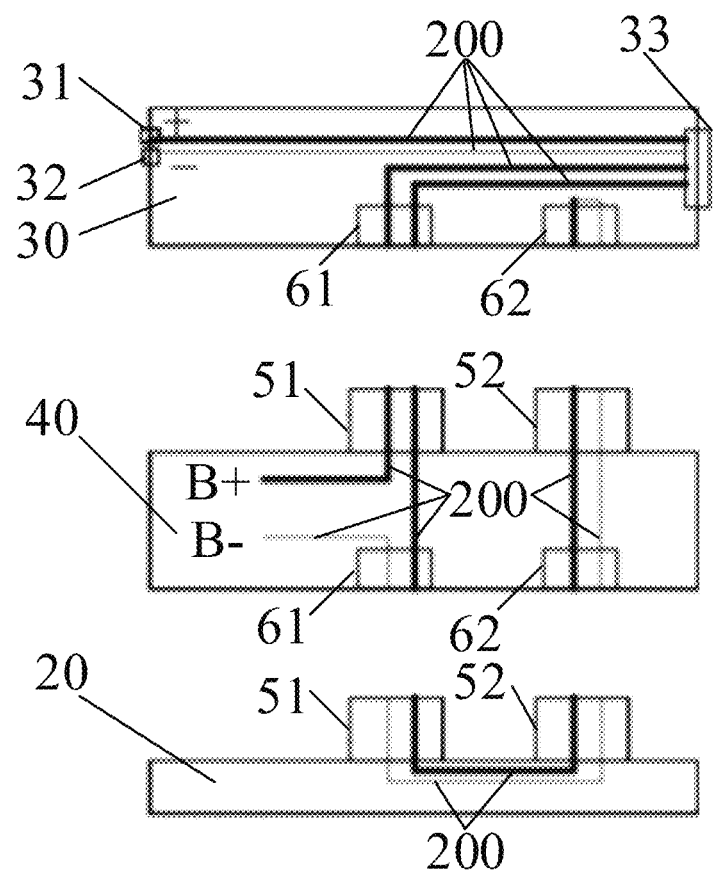
FIG. 4b is a schematic diagram of internal circuits of a battery module, a base assembly and a battery management module in a stacking power supply cabinet according to an embodiment of the present disclosure.

After the battery modules are stacked, an electric connection path for power supply and/or storage established among the multiple battery modules cannot be conducted, and only after the installation of the top assembly is completed, the electric connection path is conducted through the top assembly, specifically through a power transmission line 200 inside the top assembly (see FIG. 3b and FIG. 4b).

According to the aforementioned technical solutions, in the stacking power supply cabinet, the electric connection path for the power supply and/or storage is established among the stacked multiple battery modules 40, and the electric connection path is conducted via the top assembly, and then battery modules are charged. Thus, in the installation process of the power supply cabinet, the electric connection path for the power supply and/or storage among the multiple stacked battery modules 40 is uncharged before the top assembly is installed, thereby reducing the risk of electric shock to the human body and improving the safety during the installation process of the stacking power supply cabinet.

Optionally, the top assembly in the foregoing embodiment may be a top cover 10 (as shown in FIG. 3a) or a battery management module 30 (as shown in FIG. 4a). In practical applications, the top assembly includes but is not limited to the aforementioned two implementations which are merely two examples for illustration herein. The top assembly may be selected according to actual situations, and all of which fall within the protection scope of the present disclosure.

Two stacking power supply cabinets corresponding to the aforementioned two implementations are described in detail hereinafter.

Reference is made to FIGS. 3a and 3b, which illustrate a specific structure of a stacking power supply cabinet according to an embodiment of the present disclosure. The stacking power supply cabinet includes: a base assembly 20, a battery management module 30, a top cover 10 functioned as a top assembly and at least one battery module 40.

If the number of the battery module 40 is more than one in the stacking power supply cabinet, multiple battery modules 40 are sequentially stacked from top to bottom. The top cover 10, the base assembly 20, the battery management module 30 and the multiple battery modules 40 are respectively provided with a power transmission line 200 and a signal transmission line inside. The power transmission line 200 in the top cover 10 is configured to achieve a short-circuit connection function of the power transmission line 200 and configured to connect to an uppermost battery module 40. The power transmission line 200 in the base assembly 20 is configured to connect to the battery management module 30 and a bottommost battery module 40. The power transmission line 200 in the battery management module 30 is configured to connect to the base assembly 20 and an external device.

Referring to FIGS. 3a and 3b, the battery management module 30 includes: a breaker 33, a first terminal 60 of a quick pluggable terminal, a positive connector 31 of an energy storage device, a negative connector 32 of the energy storage device, and four power transmission lines 200.

In the battery management module 30, two power transmission lines 200 are led out from a first end of the breaker 33, pass through the first terminal 60 of the quick pluggable terminal and are connect to the base assembly 20, and then are connected to a bottommost battery module 40 via the base assembly 20. Another two power transmission lines 200 are led out from a second end of the breaker 33, and are connected to an inner terminal of the positive connector 31 of the energy storage device and an inner terminal of the negative connector 32 of the energy storage device respectively. An outer terminal of the positive connector 31 of the energy storage device and an outer terminal of the negative connector 32 of the energy storage device are used for connecting to an external device.

Referring to FIGS. 3a and 3b, the internal circuit of the top cover 10 includes: one power transmission line 200 and a first terminal 60 of a quick pluggable terminal. The power transmission line 200 is connected between a first port of the first terminal 60 of the quick pluggable terminal and a second port of the first terminal 60 of the quick pluggable terminal, and thus the two ports are short-circuited.

Referring to FIGS. 3a and 3b, the internal circuit of the base assembly 20 includes: a second terminal 51 of a first quick pluggable terminal, a second terminal 52 of a second quick pluggable terminal, and two power transmission lines 200. One of the two power transmission lines 200 is connected between a first port of the second terminal 51 of the first quick pluggable terminal and a second port of the second terminal 52 of the second quick pluggable terminal. Another one of the two power transmission lines 200 is connected between a second port of the second terminal 51 of the first quick pluggable terminal and a first port of the second terminal 52 of the second quick pluggable terminal.

Referring to FIGS. 3a and 3b, the internal circuit of each of the multiple battery modules 40 includes three power transmission lines 200, that is, a first power transmission line 200, a second power transmission line 200 and a third power transmission line 200. The first power transmission line 200 is connected to a positive electrode B+ of the battery module 40 where the first power transmission line 200 is located, and is led out from a first port of a second terminal 50 of a quick pluggable terminal on an upper surface of the battery module 40. The second power transmission line 200 is connected to a negative electrode B− of the battery module 40, and is led out from a first port of a first terminal 60 of the quick pluggable terminal on a lower surface of the battery module 40. The third power transmission line 200 is connected between a second port of the second terminal 50 of the quick pluggable terminal and a second port of the first terminal 60 of the quick pluggable terminal of the battery module 40.

According to the detailed description of components of the stacking power supply cabinet in the above, the stacking power supply cabinet with the internal circuit structure shown in FIGS. 3a and 3b can be used as an energy storage device, to meet requirements of energy storage.

In practical applications, except for energy storage, the power supply cabinet is also required to have a charging function, to meet the demand for charging external devices. In the prior art, the energy storage cabinet cannot charge external devices, so an additional charging device is installed to meet the demand for charging. Due to the installation of the additional charging device, not only the cost but also the occupied area of the energy storage cabinet may increase.

Figure 6A:
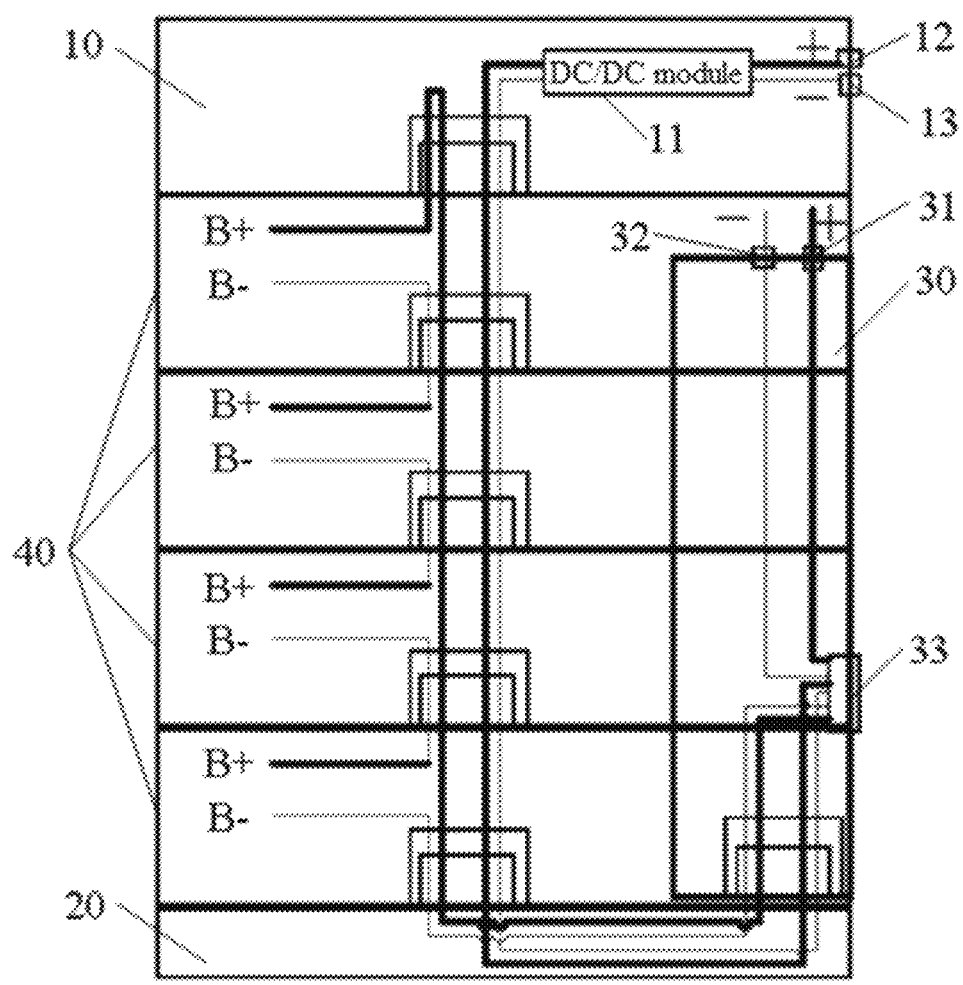
FIG. 6a is a schematic diagram of an internal circuit of a stacking power supply cabinet according to another embodiment of the present disclosure.
Figure 6B:
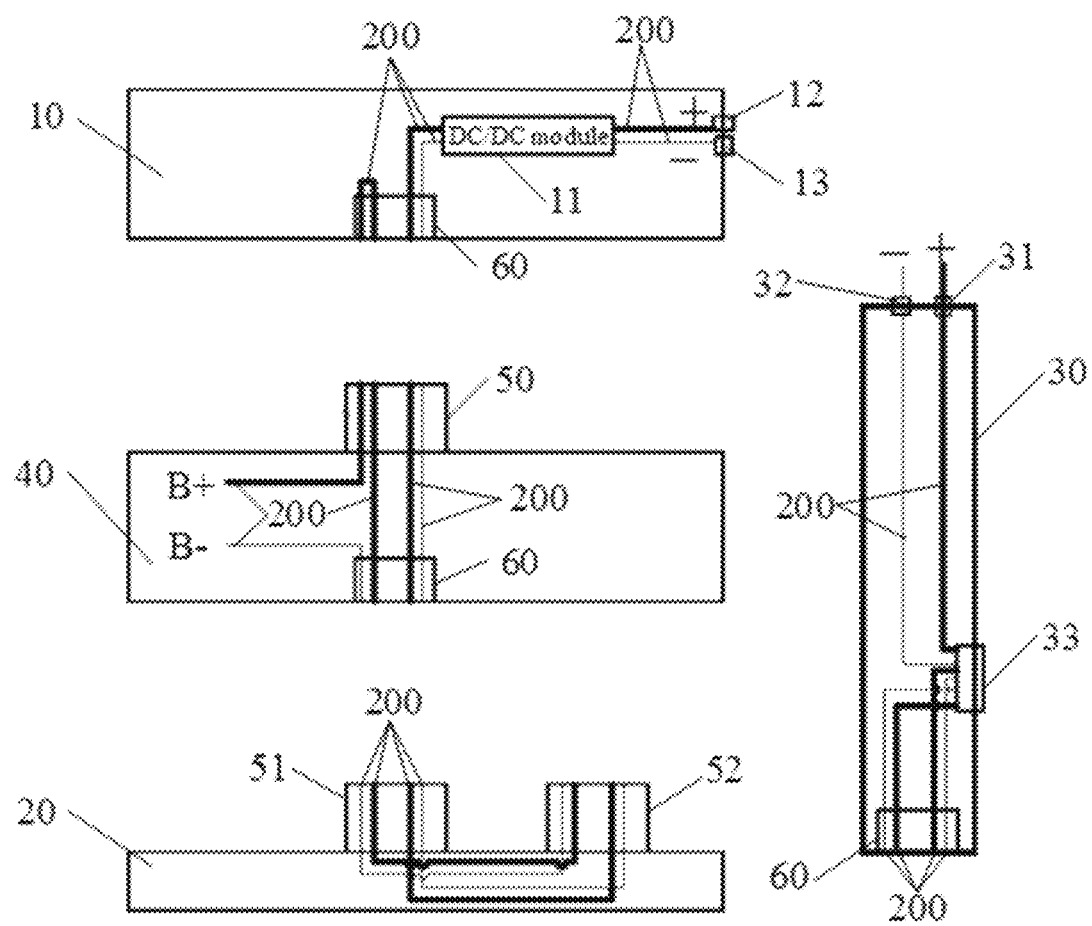
FIG. 6b is a schematic diagram of internal circuits of a top cover, a battery module, a base assembly and a battery management module in a stacking power supply cabinet according to another embodiment of the present disclosure.

In consideration of the above problems, a stacking power supply cabinet with another circuit structure is also provided according to an embodiment of the present disclosure. Referring to FIGS. 6a and 6b, the top cover 10, based on the structure as shown in FIGS. 3a and 3b, further includes: a DC/DC module 11, a positive connector 12 of a charging device, a negative connector 13 of a charging device, and additional four power transmission lines 200. One of the additional four first power transmission line 200 is used to connect a positive electrode at a first side of the DC/DC module 11 to an inner terminal of the positive connector 12 of the charging device. Another one of the additional four power transmission line 200 is used to connect a negative electrode at the first side of the DC/DC module 11 to an inner terminal of the negative connector 13 of the charging device. Another two of the additional four power transmission line 200 are led out from a second side of the DC/DC module 11, and are connected to a third port and a fourth port of the first terminal 60 of the quick pluggable terminal in the top cover 10 respectively.

Each battery module 40 includes five of the power transmission lines 200, that is, a first power transmission line 200, a second power transmission line 200, a third power transmission line 200, a fourth power transmission line 200 and a fifth power transmission line 200. The first power transmission line 200 is connected to a positive electrode B+ of a battery module 40 where the first power transmission line 200 is located, and is led out from a first port of a second terminal 50 of a quick pluggable terminal on an upper surface of the battery module 40. The second power transmission line 200 is connected to a negative electrode B− of the battery module 40, and is led out from a first port of a first terminal 60 of the quick pluggable terminal on a lower surface of the battery module 40. The third power transmission line 200 is connected between a second port of the second terminal 50 of the quick pluggable terminal on the upper surface of the battery module 40 and a second port of the first terminal 60 of the quick pluggable terminal on the lower surface of the battery module 40. The fourth power transmission line 200 is connected between a third port of the second terminal 50 of the quick pluggable terminal on the upper surface of the battery module 40 and a third port of the first terminal 60 of the quick pluggable terminal on the lower surface of the battery module 40. The fifth power transmission line 400 is connected between a fourth port of the second terminal 50 of the quick pluggable terminal on the upper surface of the battery module 40 and a fourth port of the first terminal 60 of the quick pluggable terminal on the lower surface of the battery module 40.

The internal circuit of the base assembly 20, based on the structure as shown in FIGS. 3a and 3b, further includes additional two power transmission lines 200. One of the additional two power transmission lines 200 is connected between a third port of the second terminal 51 of the first quick pluggable terminal and a third port of the second terminal 52 of the second quick pluggable terminal in the base assembly 20. Another one of the additional two power transmission lines 200 is connected between a fourth port of the second terminal 51 of the first quick pluggable terminal and a fourth port of the second terminal 52 of the second quick pluggable terminal in the base assembly 20.

The internal circuit of the battery management module 30, based on the structure as shown in FIGS. 3a and 3b, further includes additional two power transmission lines 200. The additional two power transmission lines 200 led out from the first end of the breaker 33 are connected to a third port and a fourth port of the first terminal 60 of the quick pluggable terminal in the battery module 30, and then connected to the base assembly 20, and then connected to a fourth power transmission line and a fifth transmission line passing through each of the plurality of battery modules sequentially from bottom to up, and finally connected to the second side of the DC/DC module.

From the above detailed description of components of the stacking power supply cabinet, it can be seen that the stacking power supply cabinet with the internal circuit structure shown in FIGS. 6a and 6b can not only be functioned as an energy storage device, but also as a charging device, that is, the stacking power supply cabinet is capable of charging electrical devices with different voltage levels through the voltage conversion of the DC/DC module 11. Thus, the stacking power supply cabinet can realize functions of both the energy storage device and the charging device, thereby saving the cost and occupation of the stacking power supply cabinet.

Figure 5:
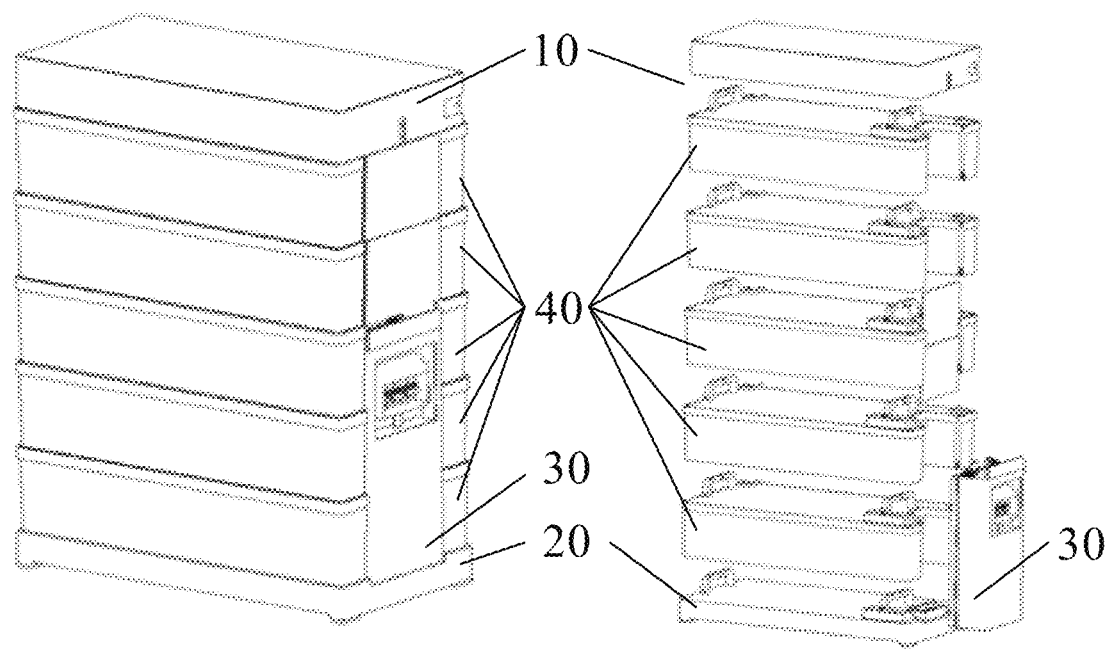

Referring to FIG. 5, in practical applications, the base assembly 20 may be arranged on the lowermost layer, each battery module 40 is sequentially stacked on the base assembly 20, and the top cover 10 is arranged above an uppermost battery module 40. In order to facilitate the connection of internal power transmission lines, the battery management module 30 may be arranged on a side of the stacking power supply cabinet. In a preferred embodiment, the battery management module 30 is arranged on a lower side of the stacking power supply cabinet as shown in FIG. 5. In order to protect the battery management module 30, the battery management module 30 is preferably arranged in an independent switching box as shown in FIG. 5.

In practical applications, the specific implementation manner in which the battery management module 30 is arranged on the lower side of the stacking power supply cabinet may be: the battery management module 30 is embedded in the battery module 40 as shown in FIG. 5; alternatively, the battery management module 30 is externally attached to any side surface of the battery module 40, which may be selected according to actual applications and will not be limited herein. In practical applications, the specific implementation manner includes but is not limited to the above two implementations, and all of which fall within the protection scope of the present disclosure.

Figure 7:
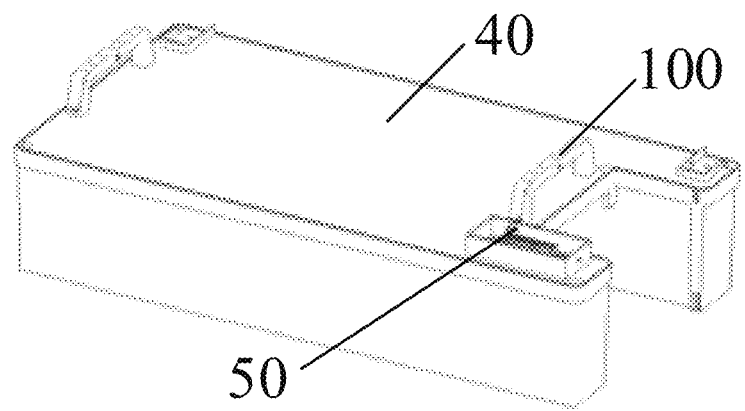
FIG. 7 is a schematic structural diagram of a battery module in a stacking power supply cabinet as shown in FIGS. 3a and 3b.

In a case that the battery management module 30 is embedded in the battery module 40, as shown in FIG. 7, one side of the battery module 40 is concave so that the battery management module 30 can be embedded. A second terminal 50 of a quick pluggable terminal is provided at a right-angle corner of an upper surface of the battery module 40, and a first terminal 60 of the quick pluggable terminal is provided at a corresponding position of a lower surface of the battery module 40 (which is not shown in FIG. 7, and can be seen in FIG. 3b and FIG. 6b).

Referring to FIG. 3b and FIG. 6b, a first terminal 60 of a quick pluggable terminal is provided at a position of a lower surface of the top cover 10 corresponding to the position of the second terminal 50 of the quick pluggable terminal in the battery module 40, to meet the requirement of quickly establishing the electrical connection between the top cover 10 and the battery management module 40.

Figure 8:
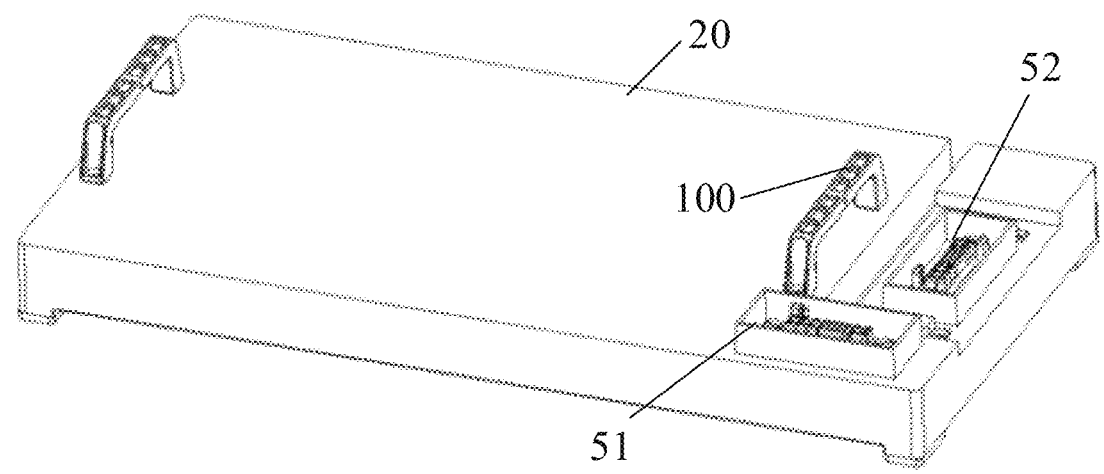
FIG. 8 is a schematic structural diagram of a base assembly in a stacking power supply module as shown in FIGS. 3a and 3b.

Referring to FIG. 8, a second terminal 51 of a first quick pluggable terminal is provided at a position on an upper surface of the base assembly 20 corresponding to the position of the first terminal 60 of the quick pluggable terminal in the battery module 40, to meet the requirement of quickly establishing the electrical connection between the base assembly 20 and the battery module 40. Furthermore, a second terminal 52 of a second quick pluggable terminal is provided on an upper surface of the base assembly 20, at a side adjacent to the second terminal 51 of the first quick pluggable terminal in the base assembly 20, to meet the requirement of quickly establishing the electrical connection between the base assembly 20 and the battery management module 30.

Figure 9:
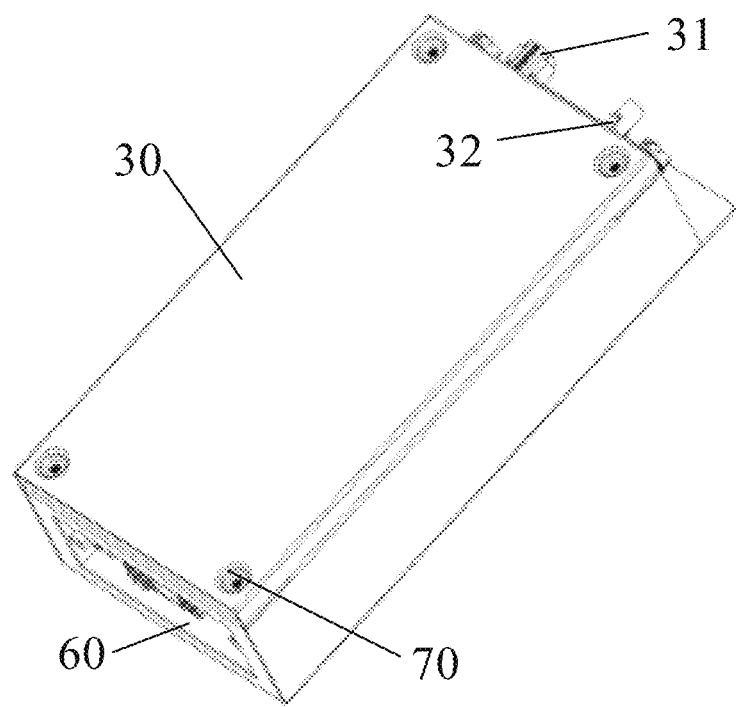
FIG. 9 is a schematic structural diagram of a battery management module in a stacking power supply module as shown in FIGS. 3a and 3b.

Referring to FIG. 9, a first terminal 60 of a quick pluggable terminal is provided at the bottom of the battery management module 30, to quickly establish an electrical connection with the base assembly 20. A positive connector 31 of an energy storage device and a negative connector 32 of the energy storage device (which are not shown in FIG. 9, and can be seen in FIG. 3b and FIG. 6b) are provided on the top of the battery management module 30. Threaded through holes 70 are provided at four right-angles on a side of the battery management module 30, to facilitate the installation of the battery management module 30.

It should be noted that, two handles 100 with a predetermined distance are provided respectively at a position on the upper surface of the base assembly 20 and a position on the upper surface of the battery module 40 corresponding to the position on the upper surface of the base assembly 20. Two concave structures (not shown in the figure) with a predetermined distance are provided at a position on a lower surface of the top cover 10 and a position on a lower surface of the battery module 40 corresponding to the position on the lower surface of the top cover 10. The two handles 100 and the two concave structures are used to limit the position during installation. The lower handle 100 is fastened to the box wall of the upper component by a bolt for the purpose of fixing. This installation method of combining the mounting component with the handle 100 can not only reduce the space occupied by the stacking power supply cabinet, but also reduce the manufacturing cost of the stacking power supply cabinet, which is beneficial to practical application of the stacking power supply cabinet.

Optionally, in a case that one side of the battery module 40 in the stacking power cabinet is concave and the number of battery modules 40 is multiple, the stacking power cabinet further includes: a side cover for covering other parts on the side surface where the switching box is located, as shown in FIG. 5. Thus, the aesthetics of the stacking power supply cabinet is improved, and dust accumulation is effectively prevented.

It should be noted that, in the aforementioned embodiments, the first terminal 60 of the quick pluggable terminal may be a male terminal of the quick pluggable terminal or a female terminal of the quick pluggable terminal, which is not limited herein; and the second terminal 50 of the quick pluggable terminal is in the same case. It should be noted that, in the aforementioned embodiments, the electrical connection between corresponding two parts is established through the first terminal 60 of the quick pluggable terminal and the second terminal 50 of the quick pluggable terminal. Therefore, the first terminal 60 of the quick pluggable terminal and the second terminal 50 of the quick pluggable terminal should be used together, that is, one terminal of the quick pluggable terminal is a male terminal, and the other terminal of the quick pluggable terminal is a female terminal. Types of the first terminal 60 and the second terminal 50 of the quick pluggable terminal are not limited herein, and may be determined according to specific circumstances, but all of which will fall within the protection scope of the present disclosure.

A stacking power supply cabinet is provided according to an embodiment of the present disclosure. Referring to FIGS. 4a and 4b, the stacking power supply cabinet includes: a base assembly 20, a battery management module 30 functioned as a top assembly and at least one battery module 40.

If the number of the battery module 40 is more than one in the stacking power supply cabinet, multiple battery modules 40 are sequentially stacked from top to bottom. The base assembly 20, the battery management module 30 and the multiple battery modules 40 are respectively provided with a power transmission line 200 and a signal transmission line inside. The power transmission line 200 in the battery management module 30 is configured to achieve a short-circuit connection function of the power transmission line 200 and a connection function with an external device, and configured to connect to an uppermost battery module 40. A power transmission line 200 in the base assembly 20 is configured to connect to a bottommost battery module 40.

Referring to FIGS. 4a and 4b, the internal circuit of the base assembly 20 includes: a second terminal 51 of a first quick pluggable terminal, a second terminal 52 of a second quick pluggable terminal and two power transmission lines 200. One of the two power transmission lines 200 is connected between a first port of the second terminal 51 of the first quick pluggable terminal and a second port of the second terminal 52 of the second quick pluggable terminal. Another one of the two power transmission lines 200 is connected between a second port of the second terminal 51 of the first quick pluggable terminal and a first port of the second terminal 52 of the second quick pluggable terminal.

The internal circuit of each battery module 40 includes five power transmission lines 200, that is, a first power transmission line 200, a second power transmission line 200, a third power transmission line 200, a fourth power transmission line 200 and a fifth power transmission line 200. The first power transmission line 200 is connected to a positive electrode B+ of the battery module 40 where the first power transmission line 200 is located, and is led out from a first port of a second terminal 51 of a first quick pluggable terminal on an upper surface of the battery module 40. The second power transmission line 200 is connected to a negative electrode B− of the battery module 40, and is led out from a first port of a first terminal 61 of the first quick pluggable terminal on a lower surface of the battery module 40. The third power transmission line 200 is connected between a second port of the second terminal 51 of the first quick pluggable terminal and a second port of the first terminal 61 of the first quick pluggable terminal. The fourth power transmission line 200 is connected between a first port of a second terminal 52 of a second quick pluggable terminal on the upper surface of the battery module 40 and a first port of a first terminal 62 of the second quick pluggable terminal on the lower surface of the battery module 40. The fifth power transmission line 400 is connected between a second port of the second terminal 52 of the second quick pluggable terminal and a second port of the first terminal 62 of the second quick pluggable terminal.

Referring to FIGS. 4a and 4b, the internal circuit of the battery management module 30 includes: a breaker 33, a first terminal 61 of a first quick pluggable terminal, a first terminal 62 of a second quick pluggable terminal, a positive connector 31 of an energy storage device, a negative connector 32 of an energy storage device, and five power transmission lines 200. Two of the five power transmission lines 200 are led out from a first end of the breaker 33, pass through the first terminal 60 of the first quick pluggable terminal and all the battery modules 400, and connect to the second terminal 51 of the first quick pluggable terminal of the base assembly 20. Another two of the five power transmission lines 200 are led out from a second end of the breaker 33, and are connected to an inner terminal of the positive connector 31 of the energy storage device and an inner terminal of the negative connector 32 of the energy storage device respectively. The outer terminal of the positive connector 31 of the energy storage device and the outer terminal of the negative connector 32 of the energy storage device are respectively used to connect an external device. A last one of the five power transmission lines 200 is arranged inside the first terminal 62 of the second quick pluggable terminal of the battery management module 30. Two ends of the last one of the five power transmission lines 200 are led out from the first port and the second port of the first terminal 62 of the second quick pluggable terminal respectively, pass through all battery modules 40, and are connected to the second terminal 52 of the second quick pluggable terminal of the base assembly 20.

From the above detailed description of components of the stacking power supply cabinet, it can be seen that the stacking power supply cabinet with the internal circuit structure shown in FIGS. 4a and 4b may be functioned as an energy storage machine to satisfy requirements of energy storage of an external device. In practical applications, the stacking power supply cabinet may adopt another internal circuit structure and also be functioned as a charging device, and an internal circuit structure thereof is described in details hereinafter.

In the stacking power supply cabinet, internal circuit structures of the base assembly 20 and each battery module 40 are similar to those of the stacking power supply cabinet as shown in FIGS. 4a and 4b, which will not be described again herein for simplicity.

Figure 10:
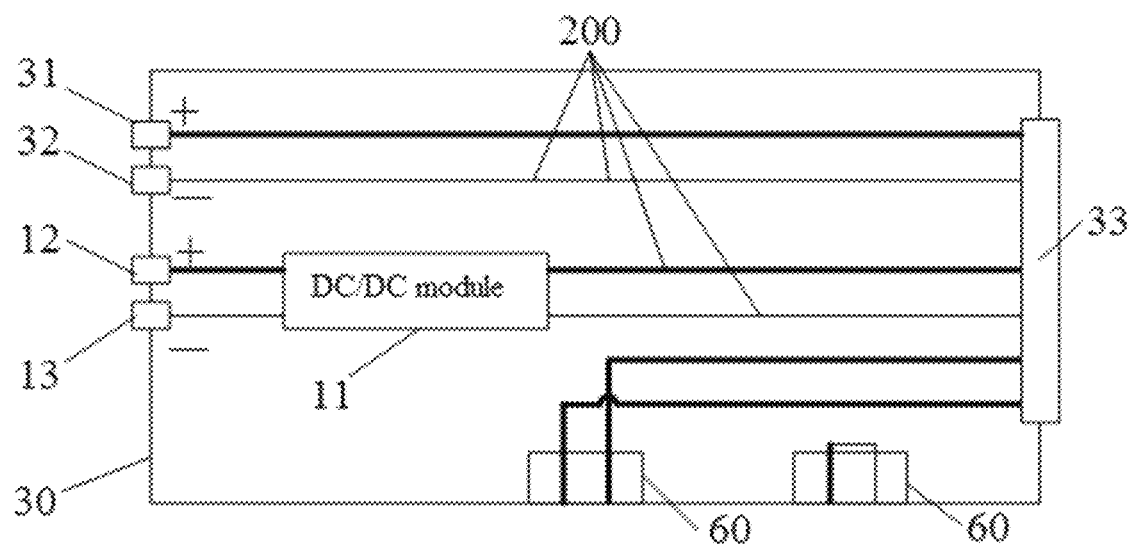
FIG. 10 is a schematic diagram of an internal circuit of a battery management module in a stacking power supply cabinet according to another embodiment of the present disclosure.

Referring to FIG. 10, the internal circuit structure of the battery management module 30, based on the structure as shown in FIGS. 4a and 4b, further includes: a DC/DC module 11, a positive connector 12 of a charging device, a negative connector 13 of a charging device, and additional two power transmission lines 200. The additional two first power transmission lines 200 connect the first end of the breaker 33 to a side of the DC/DC module 11. Another side of the DC/DC module 11 is connected to an inner terminal of the positive connector 12 of the charging device and an inner terminal of the negative connector 13 of the charging device. An outer terminal of the positive connector 12 of the charging device and an outer terminal of the negative connector 13 of the charging device are connected to an external device.

The arrangement of the second terminals and the first terminals of connecting devices on each component in the stacking power supply cabinet according to this embodiment, and the installation method between each component are similar to those described in the aforementioned embodiments, which will not be described herein for simplicity.

Each battery module 40 in the embodiments includes: a battery management system (BMS), a quick pluggable connector, and at least one battery cell. Positive electrodes of all the battery cells in the battery module are connected in series to form a positive electrode B+ of the battery module 40, and negative electrodes of all the battery cells in the battery module are connected in series to form a negative electrode B− of the battery module 40. The BMS is connected to all the battery cells in the battery module, and is connected to a signal transmission line inside the battery module 40 where the BMS is located.

The quick pluggable connector includes at least one pair of quick pluggable terminals, and each pair of quick pluggable terminals includes a second terminal 50 arranged on an upper surface of the battery module 40 and a first terminal 60 arranged on a lower surface of the battery module 40, for leading out corresponding power transmission lines 200. The quick pluggable connector in each battery module 40 in the stacking power supply cabinet as shown in FIGS. 3a and 3b includes one pair of quick pluggable terminals, and each of the pair of the quick pluggable terminals includes two ports. The quick pluggable connector in each battery module 40 in the stacking power supply cabinet as shown in FIGS. 6a and 6b includes one pair of quick pluggable terminals, and each of the pair of the quick pluggable terminals includes four ports. The quick pluggable connector in each battery module 40 in the stacking power supply cabinet as shown in FIGS. 4a and 4b includes two pairs of quick pluggable terminals, and each of the two pairs of the quick pluggable terminals includes two ports.

It should be noted that, in the aforementioned embodiments, the first terminal 60 of the quick pluggable terminal may be a male terminal of the quick pluggable terminal or a female terminal of the quick pluggable terminal, which is not limited herein; and the second terminal of the quick pluggable terminal is in the same case. It should be noted that, in the aforementioned embodiments, the electrical connection between corresponding two parts is established through the first terminal 60 of the quick pluggable terminal and the second terminal 50 of the quick pluggable terminal. Therefore, the first terminal 60 of the quick pluggable terminal and the second terminal 50 of the quick pluggable terminal should be used together, that is, one terminal of the quick pluggable terminal is a male terminal, and the other terminal of the quick pluggable terminal is a female terminal. Types of the first terminal 60 and the second terminal 50 of the quick pluggable terminal are not limited herein, and may be determined according to specific circumstances, but all of which will fall within the protection scope of the present disclosure.

The above embodiments in the present disclosure are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

The above embodiments are preferred embodiments of the present disclosure and are not intended to limit the scope of the present disclosure. It should be understood that, for those skilled in the art, alternations, modifications or equivalent substitutions may be made to the technical solutions of the present disclosure according to the methods and technical solutions above without departing from the scope of the technical solutions of the present disclosure. These alternations, modifications or equivalent substitutions made according to the technical essence of the present disclosure fall within the protection scope of the present disclosure.

The invention claimed is:

1. A stacked power supply cabinet, comprising:
   one or more battery modules sequentially stacked from top to bottom, comprising a top terminal for connecting a first electrode of the one or more battery modules and a bottom terminal for connecting a second counterpart electrode of the one or more battery modules; and
   a top assembly, stacked above the one or more battery modules, wherein
   the top assembly comprises a short-circuit connection for establishing an electrical connection between the top terminal and the bottom terminal.

2. The stacked power supply cabinet according to claim 1, wherein the top assembly comprises a top cover, and the stacked power supply cabinet further comprises
   a base assembly and a battery management module, wherein the base assembly comprises a base power transmission line connected to the battery management module and the bottom terminal which is located in a bottommost battery module of the one or more battery modules; and the battery management module comprises at least one management power transmission line connected to the base assembly and an external device.

3. The stacked power supply cabinet according to claim 2, wherein the battery management module is arranged in one side of the stacked power supply cabinet.

4. The stacked power supply cabinet according to claim 2, wherein:

the battery management module further comprises: a breaker, a first terminal of a quick pluggable terminal, a positive connector of an energy storage device, and a negative connector of the energy storage device; and the at least one management power transmission line comprises four power transmission lines, wherein two of the four management power transmission lines are connected from a first end of the breaker to the base assembly through the first terminal of the quick pluggable terminal; and another two of the four management power transmission lines are connected from a second end of the breaker to an inner terminal of the positive connector of the energy storage device and an inner terminal of the negative connector of the energy storage device, respectively.

5. The stacked power supply cabinet according to claim 2, wherein each of the one or more battery modules comprises a first electrode, a second counterpart electrode, a quick pluggable terminal having a first terminal on a lower surface of the battery module and a second terminal on an upper surface of the battery module, a first battery power transmission line, a second battery power transmission line and a third battery power transmission line, and wherein in each of the one or more battery modules:

the first battery power transmission line is connected between the first electrode and a first port of the second terminal of the quick pluggable terminal;

the second battery power transmission line is connected between the second counterpart electrode and a first port of the first terminal of the quick pluggable terminal; and the third battery power transmission line is connected between a second port of the second terminal of the quick pluggable terminal and a second port of the first terminal of the quick pluggable terminal; and wherein the electrical connection between the top terminal and the bottom terminal comprises the third battery power transmission line in each of the one or more battery modules, and a first terminal in the bottommost battery module of the one or more battery modules serves as the bottom terminal and a second terminal in an uppermost battery module of the one or more battery modules serves as the top terminal.

6. The stacked power supply cabinet according to claim 4, wherein:

the top cover further comprises: a DC/DC module, a positive connector of a charging device and a negative connector of the charging device;

each of the one or more battery modules comprises a first battery power transmission line, a second battery power transmission line, a third battery power transmission line, a fourth battery power transmission line and a fifth battery power transmission line; and the at least one management power transmission line further comprises additional two management power transmission lines connected from the first end of the breaker to the base assembly, to be connected to the fourth battery power transmission line and the fifth battery transmission line passing through each of the one or more battery modules sequentially from bottom to up, and then be connected to one side of the DC/DC module; and another side of the DC/DC module is connected to an inner terminal of the positive connector of the charging device and an inner terminal of the negative connector of the charging device respectively.

7. The stacked power supply cabinet according to claim 6, wherein each of the one or more battery modules further comprises a first electrode, a second counterpart electrode, a quick pluggable terminal having a first terminal on a lower surface of the battery module and a second terminal on an upper surface of the battery module, wherein in each of the one or more battery modules:

the first battery power transmission line is connected between the first electrode and a first port of the second terminal of the quick pluggable terminal;

the second battery power transmission line is connected between the second counterpart electrode and a first port of the first terminal of the quick pluggable terminal;

the third battery power transmission line is connected between a second port of the second terminal of the quick pluggable terminal and a second port of the first terminal of the quick pluggable terminal;

the fourth battery power transmission line is connected between a third port of the second terminal of the quick pluggable terminal and a third port of the first terminal of the quick pluggable terminal; and the fifth battery power transmission line is connected between a fourth port of the second terminal of the quick pluggable terminal and a fourth port of the first terminal of the quick pluggable terminal.

8. The stacked power supply cabinet according to claim 2, wherein one side of the one or more battery modules is concave, to embed the battery management module.

9. The stacked power supply cabinet according to claim 8, further comprising a side cover to cover other parts on the side of the one or more battery modules.

10. A stacked power supply cabinet, comprising:

one or more battery modules sequentially stacked from top to bottom;

a top assembly, stacked above the one or more battery modules; and a base assembly, wherein the base assembly comprises a base power transmission line for connecting a bottom terminal located in a bottommost battery module of the one or more battery modules;

the top assembly is a battery management module; and wherein the battery management module comprises at least one management power transmission line for connecting to the one or more battery modules and an external device.

11. The stacked power supply cabinet according to claim 10, wherein:

the battery management module further comprises: a breaker, a first terminal of a first quick pluggable terminal, a first terminal of a second quick pluggable terminal, a positive connector of an energy storage device, and a negative connector of the energy storage device;

the at least one management power transmission line comprises: two management power transmission lines connected from a first end of the breaker to the first terminal of the first quick pluggable terminal; and another two management power transmission lines connected from a second end of the breaker to an inner terminal of the positive connector of the energy storage device and an inner terminal of the negative connector of the energy storage device respectively; and wherein the battery management module further comprises a short-circuit connection having two terminals being connected to a first port of the first terminal of the second quick pluggable terminal and a second port of the first terminal of the second quick pluggable terminal of the battery management module respectively, to be connected to a second terminal of a second quick pluggable terminal of the base assembly through all the one or more battery modules; and wherein the base power transmission line is connected from a first port of a second terminal of a first quick pluggable terminal inside the base assembly to a first port of the second terminal of the second quick pluggable terminal inside the base assembly, and the second terminal of the first quick pluggable terminal inside the base assembly is detachably connected to a first terminal of the bottommost battery module of the one or more battery modules that serves as the bottom terminal, and the base assembly further comprises another base power transmission line connected from a second port of the second terminal of the first quick pluggable terminal inside the base assembly to a second port of the second terminal of the second quick pluggable terminal inside the base assembly.

12. The stacked power supply cabinet according to claim 11, wherein the battery management module further comprises: a DC/DC module, a positive connector of a charging device, and a negative connector of the charging device; wherein:

the at least one management power transmission line further comprises additional two power transmission lines connected from the first end of the breaker to a side of the DC/DC module; and another side of the DC/DC module is connected to an inner terminal of the positive connector of the charging device and an inner terminal of the negative connector of the charging device respectively.

13. The stacked power supply cabinet according to claim 10, wherein each of the one or more battery modules comprises: a first electrode, a second counterpart electrode, a first quick pluggable terminal having a first terminal on a lower surface of the battery module and a second terminal on an upper surface of the battery module, a second quick pluggable terminal having a first terminal on the lower surface of the battery module and a second terminal on the upper surface of the battery module, a first battery power transmission line, a second battery power transmission line, a third battery power transmission line, a fourth battery power transmission line and a fifth battery power transmission line; wherein in each of the one or more battery modules:

the first battery power transmission line is connected between the first electrode and a first port of the second terminal of the first quick pluggable terminal;

the second battery power transmission line is connected between the second counterpart electrode and a first port of the first terminal of the first quick pluggable terminal;

the third battery power transmission line is connected between a second port of the second terminal of the first quick pluggable terminal and a second port of the first terminal of the first quick pluggable terminal;

the fourth battery power transmission line is connected between a first port of the second terminal of the second quick pluggable terminal and a first port of the first terminal of the second quick pluggable terminal; and the fifth battery power transmission line is connected between a second port of the second terminal of the second quick pluggable terminal and a second port of the first terminal of the second quick pluggable terminal.

14. The stacked power supply cabinet according to claim 1, wherein each of the one or more battery modules comprises: a battery management system (BMS), a quick pluggable terminal and a plurality of battery cells; wherein in each of the one or more battery modules:

positive electrodes of all the plurality of battery cells in the battery module are connected in series to form a positive electrode of the battery module, and negative electrodes of all the plurality of battery cells in the battery module are connected in series to form a negative electrode of the battery module;

the BMS is connected to all the plurality of battery cells in the battery module, and is connected to a signal transmission line inside the battery module where the BMS is located; and the quick pluggable terminal comprises at least one pair of quick pluggable terminals, and each of the at least one pair of quick pluggable terminals comprises a second terminal arranged on an upper surface of the battery module and a first terminal arranged on a lower surface of the battery module.

15. The stacked power supply cabinet according to claim 2, wherein each of the one or more battery modules comprises: a battery management system (BMS), a quick pluggable terminal and a plurality of battery cells; wherein in each of the one or more battery modules:

positive electrodes of all the plurality of battery cells in the battery module are connected in series to form a positive electrode of the battery module, and negative electrodes of all the plurality of battery cells in the battery module are connected in series to form a negative electrode of the battery module;

the BMS is connected to all the plurality of battery cells in the battery module, and is connected to a signal transmission line inside the battery module where the BMS is located; and the quick pluggable terminal comprises at least one pair of quick pluggable terminals, and each of the at least one pair of quick pluggable terminals comprises a second terminal arranged on an upper surface of the battery module and a first terminal arranged on a lower surface of the battery module.

16. The stacked power supply cabinet according to claim 3, wherein each of the one or more battery modules comprises: a battery management system (BMS), a quick pluggable terminal and a plurality of battery cells; wherein in each of the one or more battery modules:

positive electrodes of all the plurality of battery cells in the battery module are connected in series to form a positive electrode of the battery module, and negative electrodes of all the plurality of battery cells in the battery module are connected in series to form a negative electrode of the battery module;

the BMS is connected to all the plurality of battery cells in the battery module, and is connected to a signal transmission line inside the battery module where the BMS is located; and the quick pluggable terminal comprises at least one pair of quick pluggable terminals, and each of the at least one pair of quick pluggable terminals comprises a second terminal arranged on an upper surface of the battery module and a first terminal arranged on a lower surface of the battery module.

17. The stacked power supply cabinet according to claim 4, wherein each of the one or more battery modules comprises: a battery management system (BMS), a quick pluggable terminal and a plurality of battery cells; wherein in each of the one or more battery modules:

positive electrodes of all the plurality of battery cells in the battery module are connected in series to form a positive electrode of the battery module, and negative electrodes of all the plurality of battery cells in the battery module are connected in series to form a negative electrode of the battery module;

the BMS is connected to all the plurality of battery cells in the battery module, and is connected to a signal transmission line inside the battery module where the BMS is located; and the quick pluggable terminal comprises at least one pair of quick pluggable terminals, and each of the at least one pair of quick pluggable terminals comprises a second terminal arranged on an upper surface of the battery module and a first terminal arranged on a lower surface of the battery module.

18. The stacked power supply cabinet according to claim 5, wherein each of the one or more battery modules comprises: a battery management system (BMS), a quick pluggable terminal and a plurality of battery cells; wherein in each of the one or more battery modules:

positive electrodes of all the plurality of battery cells in the battery module are connected in series to form a positive electrode, serving as the first electrode, of the battery module, and negative electrodes of all the plurality of battery cells in the battery module are connected in series to form a negative electrode, serving as the second counterpart electrode, of the battery module;

the BMS is connected to all the plurality of battery cells in the battery module, and is connected to a signal transmission line inside the battery module where the BMS is located; and the quick pluggable terminal comprises at least one pair of quick pluggable terminals, and each of the at least one pair of quick pluggable terminals comprises a second terminal arranged on an upper surface of the battery module and a first terminal arranged on a lower surface of the battery module.

* * * * *